United States Patent [19]

Kuwayama et al.

[11] 3,889,021

[45] June 10, 1975

[54] METHOD OF MAKING TOP PLATES FOR RANGE

[75] Inventors: Shigeo Kuwayama; Motohiko Yagi, both of Odawara, Japan

[73] Assignee: Fuji Photo Film Co., Ltd., Kanagawa, Japan

[22] Filed: Apr. 24, 1972

[21] Appl. No.: 247,057

[30] Foreign Application Priority Data

Apr. 23, 1971  Japan.................................. 46-26578

[52] U.S. Cl. ................ 427/376; 106/39.7; 427/224; 219/464
[51] Int. Cl.. C04b 41/06; C03c 17/04; B32b 17/06
[58] Field of Search............ 117/125, 124 A, 124 B, 117/123 A, 169 A; 264/60, 62, 63; 219/464; 106/39.7

[56]  References Cited
UNITED STATES PATENTS

| | | | |
|---|---|---|---|
| 3,406,279 | 10/1968 | Ziver...................................... | 264/60 |
| 3,500,444 | 3/1970 | Hesse et al........................... | 219/464 |
| 3,541,305 | 11/1970 | Kuwayama et al. ................. | 219/464 |
| 3,632,983 | 1/1972 | Dills..................................... | 219/464 |

OTHER PUBLICATIONS

Chemical Abstracts, Vol. 54: 23247a, "Refractory Compositions."

Primary Examiner—William D. Martin
Assistant Examiner—William H. Schmidt
Attorney, Agent, or Firm—Sughrue, Rothwell, Mion, Zinn & Macpeak

[57]  ABSTRACT

A process for producing a crystalline glass type top plate for electric ranges having improved strength which comprises coating the surface of a crystalline glass base plate with a suspension of a mixture of (1) a powder of a crystallizable glass having almost the same thermal expansion coefficient as that of the base plate after being crystallized or (2) a powder of a crystalline glass or a quartz glass having almost the same thermal expansion coefficient as that of the base glass plate; and a powder of a bonding clay; the suspension having added therein an inorganic adhesive mainly composed of aluminum phosphate, drying the coated layer, and burning it is disclosed.

5 Claims, No Drawings

METHOD OF MAKING TOP PLATES FOR RANGE

BACKGROUND OF THE INVENTION

1. Field of the Invention

This invention relates to a method of producing a top plate for an electric or gas range and more particularly this invention relates to a method of producing a top plate made of a crystalline glass plate having improved properties.

2. Description of the Prior Art

Recently, an electric or gas range of the type in which a top plate as a heating source is disposed between a heating source placed in the range and the materials to be heated has been marketed. As materials for such top plates, a crystalline glass having a high hardness, a smooth and beautiful surface, a high thermal resistance, and a small thermal expansion coefficient is used.

Where such a top plate for an electric range is used, electric resistance heating ribbons of heat resisting alloys or sheathed heaters are closely attached to the surface of the top plate for increasing the thermal efficiency of the range. In such a construction, no difficulties occur when the surface temperature of the top plate is lower than about 300°C. However, when the surface temperature of the top plate becomes higher than 500°C, difficulties occur in that the crystalline glass having a low thermal expansion coefficient reacts with the high-temperature electric resistance heating ribbons or the tube in which the heater is sheathed and metal ions diffuse into the crystalline glass, whereby the crystalline glass plate is damaged in a short period of time and becomes unusable.

It is known that the occurrence of such a difficulties can be prevented by coating the surface of the crystalline glass plate with a surface coating material. That is to say, according to conventional approaches a coated crystalline glass plate for the top plate is produced by coating the surface of a crystallizable glass plate with a suspension mainly composed of a powder of a crystallizable glass having almost the same thermal expansion coefficient as that of the crystallizable glass plate or a powder of a crystalline glass, a quartz glass, $\beta$-spodumene, petalite, or the like having almost the same thermal expansion coefficient as that of the crystalline glass formed by subjecting the crystallizable glass plate to a crystallizing treatment and a bonding of a clay powder so that the thickness of the coating layer becomes less than about 0.5 mm and then after drying the coated layer, subjecting the whole substances to a crystallizing heat treatment.

The feature of the above-described conventional method is in the point that the sintering of the coated layer and the crystallizing heat treatment of the crystallizable glass plate and the coated layer are conducted simultaneously. However, when a crystalline glass plate is used as the top plate for ranges, it is necessary to polish the surface of the side of the crystalline glass plate to be brought into contact with the material of the slub in the furnace used in heat treating. Thus, if one surface of the crystallizable glass plate is polished prior to the crystallizing heat treatment, the other surface of the plate is coated with a surface coating material, and after drying the coated layer, the crystallizable glass plate having the coating is subjected to a crystallizing heat treatment in accordance with the above-described conventional method, the polished surface of the plate tends to be scratched or roughened, or, further, deformed by the contact of the polished surface with the slub plate of a heat treating furnace or fillers in the furnace as a result of the highest temperature for the crystallizing heat treatment being higher than the annealing temperature.

On the other hand, there is proposed a method wherein both surfaces of a crystallizable glass plate are polished prior to the crystallizing heat treatment. Then, only one surface of the glass plate is coated with a coating material and after drying, heat-treated for crystallization, and the coated layer cooled, the other surface of the glass plate is polished, but there occurs in such a method a tendency that the coated layer attached to the glass plate by burning is locally stripped off.

An object of this invention is to solve the aforesaid problems.

SUMMARY OF THE INVENTION

That is to say, the present invention provides a method for producing a top plate for a range comprising coating the surface of a crystalline glass plate with a suspension of a mixture of (1) a powder of a crystallizable glass having after being crystallized almost the same thermal expansion coefficient as that of the crystalline glass plate, or (2) a powder of a glass or a ceramic having almost the same thermal expansion coefficient as that of the crystalline glass plate; and a bonding clay powder; said suspension having further added therein an amount of an inorganic adhesive mainly consisting of from about 0.5 to 2 parts by weight of an aluminum phosphate material, based on the total weight of the dried coating, drying the coated layer, and subjecting the coated layer to a burning treatment.

DETAILED DESCRIPTION OF THE INVENTION

Because the top plate for range produced by the method of this invention has the pre-crystallized crystalline glass plate as the base plate, no adverse influence affects the polished surface of the plate at the burning treatment and neither bending nor deformation is caused.

Examples of the compositions and the preparations of crystallizable or crystalline glass are described in U.S. Pat. Nos. 2,887,394; 2,971,853; 2,920,971; 2,998,675; 3,013,362; 3,040,213; 3,096,159; 3,113,009; 3,146,114; 3,148,994; 3,149,982; 3,157,522; 3,161,528; 3,169,072; 3,201,266; 3,241,985; 3,205,079; 3,231,399; 3,236,662; 3,246,972; 3,251,396; 3,252,811; 3,253,975; 3,275,493; 3,279,931; 3,282,770; 3,313,609; 3,313,644; 3,380,838; and 3,252,811.

The powder of the glass or ceramic having almost the same thermal expansion coefficient as that of the crystalline glass plate can be a powder of a crystalline glass, a quartz glass, $\beta$-spodumene, petalite or cordierite.

As the aluminum phosphate material, the use of which is a very important feature of this invention, there are illustrated aluminum primary phosphate ($Al_2O_3 \cdot 3P_2O_5 \cdot 6H_2O$), a complex salt of aluminum primary phosphate, and aluminum chromium phosphate ($Al_2O_3 \cdot 0.25Cr_2O_3 \cdot 3P_2O_5 \cdot nH_2O$).

The inorganic adhesive used in this invention consists mainly of the above-mentioned aluminum phosphate and may contain a small amount of other components.

Typical examples of the bonding clay are kibushi clay, Georgia kaolin, Zettlitz kaolin, etc. Generally the amount of the clay can range from about 5 to 25, preferably from about 8 to 18 percent by weight based on the total weight of the solid components in the mixture.

The suspension is prepared by suspending the components described above in a liquid medium as the liquid medium, water is preferably used since it has the advantages that it is inexpensive and there is no danger of fire, but the liquid medium is not limited to water and other liquids in which the above-described components can be suspended can be employed in this invention. For instance, there may be employed various kinds of alcohols such as methanol, ethanol, isopropanol and the like, oils, or mixtures thereof. Generally, any liquid can be used for this purpose.

The techniques of coating the suspension, drying the coated layer, and burning treatment used in this invention which can be used can be any of the methods known in this art such as brushing, roll-coating, casting, spraying, and the like, and the method used is not limited to any specific one. Suitable burning temperatures range from about 600°C to 900°C.

The top plate produced by the method of this invention can be effectively used as the hot plate for an electric range of the type in which the hot plate is brought into contact with the electrical heating element alloy.

In the example of this invention shown below, the crystallizable glass used was the same material as was used for making the crystalline glass plate but other glasses having substantially the same thermal expansion coefficient as that of the crystalline glass plate, such as crystalline glass, quartz glass, $\beta$-spodumene, petalite, and cordierite may be effectively employed in this invention as the glass powder for the suspension.

Now, the invention will be explained in greater detail by reference the following example.

EXAMPLE

Powdered raw materials for a $Li_2O$—$Al_2O_3$—$SiO_2$ type crystallizable glass having a blend composition consisting of 70.0 percent by weight $SiO_2$, 18.0 percent by weight $Al_2O_3$, 2.6 percent weight $Li_2O$, 1.7 percent $TiO_2$, 2.0 percent by weight $ZrO_2$, 20 percent by weight MgO, 1.7 percent by weight ZnO, 0.5 percent by weight $Sb_2O_3$, and 0.5 percent by weight $As_2O_3$ were melted and the glass molded into a plate by rolling. The glass plate was then annealed, cooled, cut and polished to provide a square glass plate of 275 × 275 $mm^2$ in area and 5.0 mm in thickness having one polished surface on one side and on the other side a ground surface. The thermal expansion coefficient of the glass was $+35 \times 10^{-7}$ cm/cm°C and the specific gravity of the glass was 2.43.

The glass plate was crystallized by placing it on a flat slub in an electric furnace, increasing the temperature of the furnace to 700°–920°C at a temperature increasing rate of 30°C per hour, maintaining the glass plate for 6 hours at 920°C., and then cooling it. The linear thermal expansion coefficient of the crystallized glass plate was $+ 6 \times 10^{-7}$ cm/cm°C, which was markedly smaller than that of the glass before the crystallization, and the specific gravity of the resulting crystallized glass was 2.56. The crystallized glass was milky glass. From the results obtained on X-ray diffraction analysis, the crystallized glass thus obtained was confirmed to contain the crystal of a solid solution of $\beta$-eucryptite and -quartz.

Separately from this, a $Li_2O$—$Al_2O_3$—$SiO_2$ type crystallizable glass having the same composition as the crystallizable glass plate prepared above was crushed and sieved using a 100-mesh sieve. 88 parts by weight of the glass powder was mixed with 40 parts by weight of water and 12 parts by weight of kibushi clay as a bonding clay. An aqueous solution of aluminum primary phosphate was added to the mixture in the amount as shown in Table 1 per 100 parts by weight of the solid components in the mixture. The mixture was then mixed in a ball mill to provide a suspension.

The suspension was applied uniformly to the ground surface of the crystalline glass plate prepared above using a spray gun and the coated glass was dried to form a layer of about 0.2 mm in thickness. Thereafter, the crystalline glass plate having the coated layer was placed in an electric furnace and burned therein for the period of time and at the temperature shown in Table 1.

Table 1

| Sample No. | 1 | 2 | 3 | 4 | 5 |
| --- | --- | --- | --- | --- | --- |
| Amount of Aluminum Primary Phosphate (parts by weight) | 0.5 | 0.5 | 1 | 1 | 2 |
| Burning Temperature (°C) | 600 | 800 | 600 | 800 | 800 |
| Burning Period (hours) | 3 | 3 | 3 | 3 | 6 |
| Adhesive Strength | weak | medium | strong | strong | strong |
| Practical Evaluation | good | excellent | excellent | excellent | bad* |

(*): the glass broke after 40 hours.

From the results of the characteristic evaluations shown in the above table, it has been confirmed that the adhesive strength of the coated layer was increased the larger the amount of the aluminum primary phosphate and the higher the burning temperature. Also, when the amount of aluminum primary phosphate was less than 0.5 part by weight, the adhesive strength of the coated layer was weak and the hot plates prepared by changing the burning temperature at this small content of aluminum primary phosphate were unsuitable for practical purposes.

On the other hand, from the results of these evaluations, it was confirmed that when a top plate having a coated layer containing more than 2 parts by weight of aluminum primary phosphate was used in a practial manner for an electric range, after about 40 hours the hot plate broke and thus such a hot plate is unsuitable for a long term use as a hot plate for a range. Although the exact reason for the above fact is not clearly understood, it is believed that when the top plate was used for electric range for a long period of time at a high temperature, a high temperature contact reaction occurs markedly between the $Li_2O-Al_2O_3-SiO_2$ type crystalline glass and aluminum primary phosphate as the adhesive contained in the coated layer and as a result the crystalline glass was locally deteriorated.

What is claimed is:

1. A method of producing a top plate for a range consisting essentially of coating the surface of a crystalline glass plate with a layer of a suspension in a liquid medium of a mixture consisting essentially of (1) a powder of a crystallizable glass which after being crystallized has substantially the same thermal expansion coefficient as that of said crystalline glass plate or (2) a powder of a glass or ceramic having substantially the same thermal expansion coefficient as that of said crystalline glass plate; a powder of a bonding clay; and an inorganic adhesive containing as the main component from 0.5 to less than 2percent by weight, based on the total weight of the solid components, of an aluminum phosphate selected from the group consisting of an aluminum primary phosphate and aluminum chromium phosphate, drying said coated layer, and subjecting said layer to a burning treatment at a temperature of from about 600°C to 900°C.

2. The method of producing a top plate for a range as set forth in claim 1, wherein said crystalline glass plate is a $Li_2O-Al_2O_3-SiO_2$ type crystalline glass having a low thermal expansion coefficient.

3. The method of producing a top plate for a range as set forth in claim 1, wherein said aluminum phosphate is aluminum primary phosphate.

4. The method of producing a top plate for a range as set forth in claim 1, wherein said crystallizable glass has the same composition as a crystallizable glass used in providing said crystalline glass plate.

5. The method of producing a top plate for a range as set forth in claim 1, wherein said powder of a glass or ceramic is crystalline glass, quartz glass, $\beta$-spodumene, petalite, or cordierite, each having substantially the same thermal expansion coefficient as that of said crystalline glass plate.

* * * * *